March 17, 1953  M. T. CICHELLI  2,631,727
ADSORPTION PROCESS AND APPARATUS
Filed Dec. 27, 1949
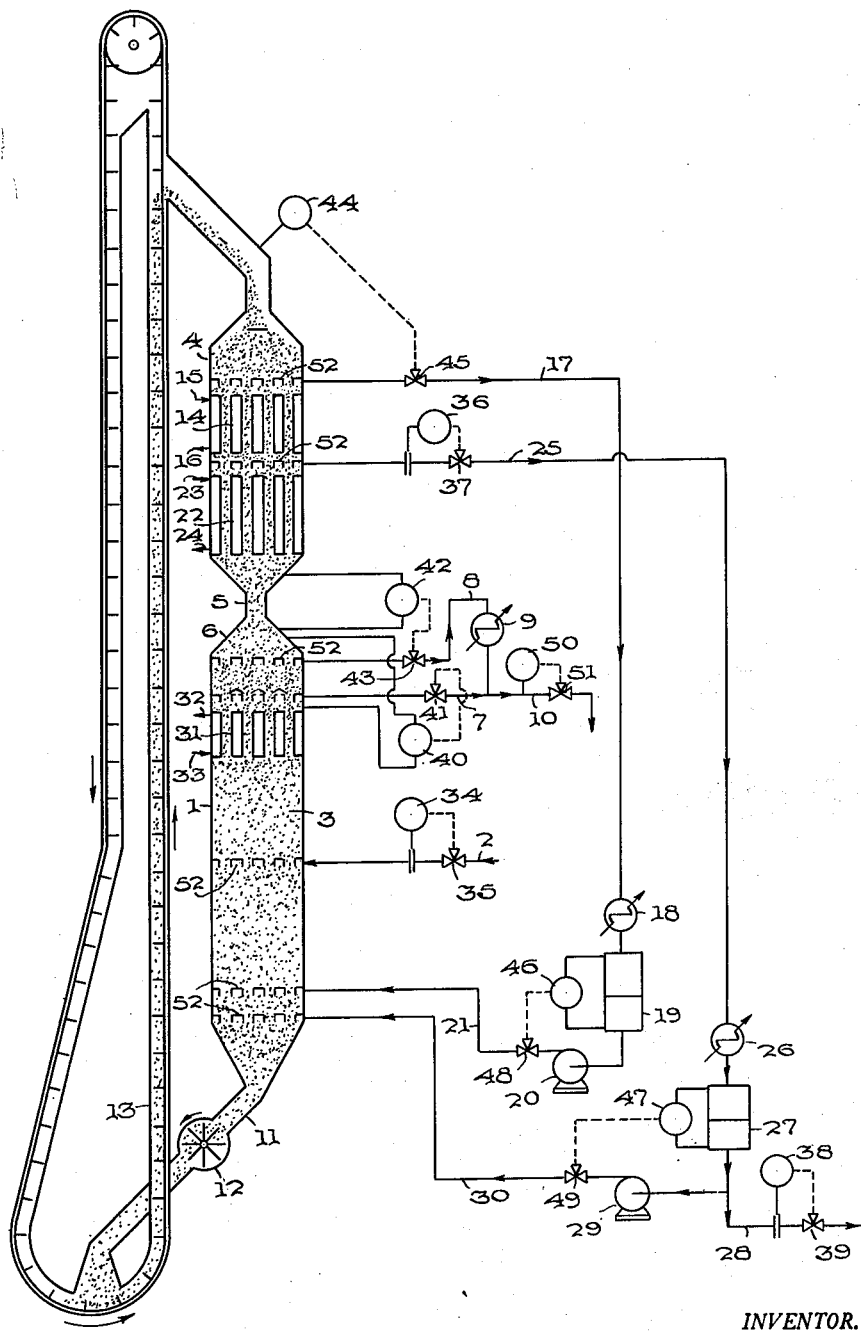
INVENTOR.
M. T. CICHELLI
BY  A. M. Houghton
ATTORNEY Patented Mar. 17, 1953

2,631,727

UNITED STATES PATENT OFFICE 2,631,727

ADSORPTION PROCESS AND APPARATUS

Mario T. Cichelli, Pittsburgh, Pa., assignor to Gulf Research & Development Company, Pittsburgh, Pa., a corporation of Delaware Application December 27, 1949, Serial No. 135,177

10 Claims. (Cl. 210—42.5)

This invention relates to a process and apparatus for separating liquids by adsorption on a solid adsorbent and more particularly to a process and apparatus for separating a liquid mixture in a continuous manner by selectively adsorbing a component of the mixture on a solid adsorbent and thermally desorbing the adsorbent to recover the separated component.

In the separation of fluid mixtures it is frequently impossible or undesirable to employ the conventional separation processes such as solvent extraction and distillation. For example, there may be no suitable solvent available for separating the particular fluids by solvent extraction. Distillation may be unsuitable if the mixture has a constant boiling point or if the relative volatility of the mixture is too small for economical distillation. Thus, it has been necessary to develop additional separation processes and one group of such processes is based on the principle that many compounds have differences in degree of adsorbability in solid adsorbents. "Hypersorption" and chromatography are two known processes based on the principle of selective adsorption in a solid adsorbent.

"Hypersorption" is a continuous process for separating the components of gaseous mixtures by selective adsorption in a countercurrently flowing body of adsorbent carbon particles. Chromatography is a batch process for separating liquids by flowing a liquid mixture through a column of solid adsorbent particles whereby the components of the mixture are adsorbed in separate bands in the column according to their adsorption coefficients. The pure components are then recovered by elution of the column which removes the components separately from the adsorbent or by physical division of the adsorbent material along the band boundaries followed by elution or heat stripping of the divided portions.

Both chromatography and "Hypersorption" are suitable processes for separating mixtures of liquids and gases respectively under certain conditions but each has its definite limitations of applicability and it has therefore been desirable to develop a separation process for employment where chromatography and "Hypersorption" are unsuitable.

In commercial practice it is highly desirable to obtain continuous operation for liquid separation as in the "Hypersorption" process for gas separation. It is also desirable to recover adsorbed components from the solid adsorbent by heat stripping or thermal desorption which is usually the simplest, most rapid, and most economical method for desorbing the adsorbent. However, previous attempts to apply continuous operation and heat stripping to the separation of liquids by solid adsorption have met with great difficulties. For example, although continuous separation and heat stripping may be employed in gas separation, as in "Hypersorption," it is very difficult to recover a pure adsorbed component when separating liquids in this manner because of the occluded liquid problem. When a solid adsorbent passes through a stream of liquid mixture, one component of said mixture being more readily adsorbable than others, the solid adsorbent will carry a portion of the mixture with it as an adsorbed phase more rich in the readily adsorbable component than the original mixture. However, there is also carried with the solid adsorbent some occluded or adhering liquid having the composition of the original mixture or other composition less rich in the readily adsorbable component than the adsorbed portion. When such solid adsorbent is thermally desorbed to recover the adsorbed phase, the occluded mixture is also vaporized and an impure product is obtained comprising the adsorbed portion contaminated with the occluded liquid mixture.

A further serious difficulty in continuously separating liquids by solid adsorption and thermal desorption is encountered in cooling the heated adsorbent material following desorption. It is necessary to cool this adsorbent material considerably to restore its adsorbent properties. Previous attempts at indirect cooling as by flowing the solids through conventional tubular heat exchangers have been largely unsuccessful due to the poor coefficients of heat transfer between the solid particles and heated tubes. These various difficulties have in the past prevented the development of a satisfactory process which combined all of the advantages of liquid separation, solid adsorption, thermal desorption, and continuous operation.

Accordingly, it is an object of this invention to provide an improved process and apparatus for separating the components of liquid mixtures.

Another object is to provide a process and apparatus for separating the components of a liquid mixture in a continuous manner by preferential adsorption in a solid adsorbent whereby an adsorbed component of the liquid mixture may be recovered by thermally desorbing the adsorbent material.

Another object is to provide an improved method and apparatus for cooling solid adsorbent material in the continuous separation of liquids.

Another object is to provide an improved method and apparatus for thermally desorbing solid adsorbent material in the continuous separation of liquids.

A still further object is to provide a process and apparatus for separating the components of a liquid mixture in a continuous manner by preferential adsorption in solid adsorbent whereby an adsorbed component of the liquid mixture may be recovered from the solid adsorbent uncontaminated by occluded liquid mixture. Other objects will appear hereinafter.

These and other objects are accomplished by my invention which includes causing a body of solid adsorbent particles to flow continuously through a desorption zone and an adsorption zone, introducing a liquid feed mixture into said adsorption zone in countercurrent flow to said adsorbent particles moving therethrough whereby a portion of said feed mixture is adsorbed by and carried with said adsorbent particles to be recovered as adsorbed product rich in one component of the feed mixture and another portion of said feed mixture passes through said adsorbent particles to be recovered as non-adsorbed product rich in another component of the feed mixture, heating the adsorbent particles as they flow through the desorption zone to vaporize the adsorbed material, continuously withdrawing the vaporized adsorbed material from the desorption zone as the adsorbed product, continuously withdrawing the non-adsorbed portion of the feed mixture from the adsorption zone as the non-adsorbed product, and cooling the heated adsorbent particles as they enter the adsorption zone to restore their adsorbent properties by directly introducing said heated adsorbent particles into the countercurrently flowing non-adsorbed portion of the liquid feed mixture prior to its withdrawal from the adsorption zone as non-adsorbed product.

Another feature of this invention is the provision of apparatus adapted to the practice of the liquid separation process of the invention. This apparatus comprises an adsorption section in which a liquid feed mixture is flowed countercurrently to solid adsorbent particles, a desorption section in which adsorbed material is thermally desorbed from adsorbent particles passing therethrough and a means for providing continuous flow of solid adsorbent particles through these sections. The desorption section has means for heating solid adsorbent particles passing therethrough in continuous flow whereby to drive off adsorbed material from said particles. The adsorption section has an entrance at one end thereof and an exit at the other end thereof for said adsorbent particles, a feed inlet means for introducing liquid feed mixture between said entrance and exit so that it flows toward the entrance countercurrently to the flow of adsorbent particles, and means for removing a non-adsorbed portion of the feed mixture disposed near the entrance for adsorbent particles between the feed inlet means and said entrance. The entrance for adsorbent particles to the adsorption section is disposed to receive adsorbent particles from the desorption section and is closer to said desorption section along the part of adsorbent particles flow than any active cooling means. There is also a means for introducing hot desorbed adsorbent particles directly from the desorption section into initial cooling contact with the non-adsorbed portion of the liquid mixture within and near the entrance to said adsorption section.

In the following examples and description I have set forth several of the preferred embodiments of my invention but it is to be understood that these are given by way of illustration and not in limitation thereof.

The invention can best be described with reference to the drawing wherein I have illustrated a diagrammatic elevation partly in section of suitable apparatus for carrying out my invention.

The illustrated apparatus of my invention comprises a vertical column having a desorption section comprising a desorber 4, an adsorption section comprising the adsorption column 1, means for directly introducing hot desorbed adsorbent particles from desorber 4 into the adsorption column 1 comprising the constriction 5, and a conveyor comprising the elevator 13 for delivering adsorbent material from the adsorption section to the desorption section.

The desorber 4 contains low temperature heating tubes 14 and high temperature heating tubes 22. Conduit lines 17 and 25 remove materials vaporized by heating in the desorber. The desorption column 1 which is adapted for countercurrent flow therein of a liquid feed mixture and solid adsorbent particles has an entrance 6 at one end thereof disposed to receive hot adsorbent particles directly from the desorber 4 and an exit 11 for adsorbent particles at the other end thereof for delivering adsorbent particles to a solids feeding device 12 and elevator 13. Said adsorption column has also conduit means for introducing liquid feed mixture into the column comprising the feed inlet line 2 with its associated flow controller 34 and valve 35. Conduit means for removing a non-adsorbed product as top product are disposed near the upper end of column 1 so that they are near the entrance 6 for solid particles and between said entrance and the feed inlet 2. The non-adsorbed product removal means include liquid removal line 7 and vapor removal line 8. Below the feed point, between feed inlet 2 and the exit 11 for adsorbent particles, the adsorption column is provided with inlet lines 30 and 21 for reflux and return of unseparated mixture, respectively. Both the desorber 4 and adsorption column 1 are also provided with distributors and collectors 52 at the points for introduction or removal of liquid or vapor, which distributors and collectors are so designed as to assure addition or removal of substantially equal amounts at all areas within the cross-section of the column.

For purposes of convenience I will describe the operation of the apparatus and process of my invention in connection with the separation of propylene from a mixture of propylene and propane, using silica gel as the adsorbent.

A liquid feed mixture of propane and propylene is fed at a controlled rate into adsorption column 1 by way of feed inlet line 2. Substantially all of the feed is directed upwardly in the column. A stream of solid particles of silica gel 3 flows downwardly under the influence of gravity through desorber 4 and into constriction 5 which serves as a means for directly introducing the solid particles into the entrance 6 for solid particles of column 1 where the particles continue to move downwardly under the influence of gravity and countercurrently to the flow of feed liquid.

Since olefins have a higher degree of adsorbability in silica gel than paraffins, the adsorbent material moving downwardly through column 1 strips propylene from the upflowing liquid by adsorbing a propylene-rich portion of the liquid so that the liquid is enriched in propane as it flows up the column. The non-adsorbed propane-rich portion of the liquid reaches the top of the column as a substantially propylene-free product and is removed partly as liquid and partly as vapor through non-adsorbed product removal lines 7 and 8, respectively. The vapor of line 8 is converted to liquid in condenser 9 and combines with the liquid of line 7 to be withdrawn through line 10 as a non-adsorbed product of propane-rich liquid.

The solids leave the adsorption column 1 through the exit 11 for adsorbent particles at the lower end of said column at a rate controlled by solids feeding device 12. The solids leaving the adsorption column 1 carry adsorbed propylene-rich material and also a portion of adhering or occluded liquid mixture less rich in propylene than the adsorbed material. They are lifted by the elevator 13 above the liquid level of the elevator, which liquid level is maintained between the levels of lines 7 and 8, thereby being at least partially drained of adhering or occluded liquid mixture and are discharged along with the propylene-rich adsorbed material and the remaining adhering or occluded liquid mixture into the top of the desorber 4. The heating tubes 14 occupy a low temperature part of the desorber. Hot vapors are introduced into tubes 14 through line 15 and condensate is withdrawn through line 16. Tubes 14 heat the solids to slightly above the boiling point of the occluded liquid mixture to drive off as vapor practically all this adhering or occluded liquid. This vapor stream is withdrawn through line 17, is converted to liquid in condenser 18, is passed through accumulator 19 and is returned to column 1 by pump 20 through line 21 at the point where the liquid composition in the column equals the composition of the vapor withdrawn through line 17. This material is intermediate in composition between the adsorbed product and the non-adsorbed product withdrawn through line 10 and should preferably be returned to the adsorption column for separation as shown in the drawing.

The solids drop farther down through the desorber into a high temperature part of the desorber occupied by heating tubes 22. Vapors hotter than those of line 15 are introduced into tubes 22 through line 23. Condensate is removed through line 24. Tubes 22 heat the adsorbent to a temperature high enough to remove most of the adsorbed material as propylene-rich vapor through line 25. After being condensed in condenser 26 this propylene-rich material passes through accumulator 27 and part of the material is withdrawn through line 28 as an adsorbed product or bottom product while the remainder is pumped back into the bottom of column 1, through pump 29 and line 30 to serve as liquid reflux in the stripping section of the column. This propylene-rich liquid reflux strips the propane constituent from the adsorbed material carried with the solids descending past the feed point, thus making the adsorbed material richer in propylene and the non-adsorbed liquid richer in propane.

The hot solid adsorbent particles leave the desorber 4, passing through the constriction 5 and are thereby directly introduced into the entrance 6 for adsorbent particles of the column 1. Thus, without passing through any active cooling means, either direct or indirect, between the desorber and the adsorption column, the hot adsorbent particles flow directly into the cooler non-adsorbed propane vapors in equilibrium with the non-adsorbed liquid which is removed as non-adsorbed product or top product by line 7. As the particles contact the vapor some cooling takes place and as the particles settle into the liquid near the top of column 1, further cooling of the particles by direct contact with the relatively cool propane-rich liquid takes place and adsorption of a propylene-rich phase begins. The cooling of the solid and the adsorption of the liquid is accompanied by an evolution of vapor which is withdrawn through line 8.

If the cooling effect on the solids of the direct contact with vapor and liquid non-adsorbed product is inadequate, indirect cooling means such as cooling tubes 31 having coolant inlet line 33 and coolant exit line 32 may be provided to cool the ascending liquid before it reaches the point of initial cooling contact with the descending adsorbent particles. Coolant tubes 31 will also have some cooling effect on the descending solids but since the transfer of heat from solid particles to such indirect cooling means is inefficient, the primary effect of coolant tubes 31 is to cool the ascending liquid thereby improving its cooling effect upon the entering solids. The tubes of course are much more efficient in cooling a liquid than in cooling a solid material.

In separating a propane-propylene mixture with a silica gel adsorbent as described above, the liquid-vapor interface temperature may be maintained at about 150° F. This produces a column pressure of about 344 lbs./sq. in. abs. (vapor pressure of propane). The liquid in the adsorption column below the cooling tubes 31 may be several degrees above ambient temperature. To drive off occluded liquid the temperature of the solids at the bottom of the low temperature heating tubes 14 may be about 135° to 140° F. Exhaust steam may be used in these low temperature tubes. The high temperature heating tubes 22 of the desorber may employ high pressure steam or "Dowtherm" and should heat the solids to a temperature of the order of 500° F. for removing adsorbed propylene. Excessive temperatures should be avoided to prevent cracking of the propylene, but too low a temperature is also unsatisfactory since the propylene would not be completely desorbed from the adsorbent.

Fines formed in the process are carried out with the top product through line 10 and may be removed by filtration or by other suitable means. In controlling the operation of the apparatus, the feeding device 12 permits the solid adsorbent particles to pass through the apparatus at a controlled rate. The solids in the column are maintained at a constant level near the top of the desorber 4 by adding fresh solid particles as needed at a rate equal to the rate at which the fines are withdrawn with the liquid stream leaving through line 10.

Flow controller 34, by controlling valve 35 in line 2, maintains a constant liquid feed rate. Flow controller 36 which controls valve 37 in line 25, together with flow controller 38 which controls valve 39 in line 28, maintains a constant bottom product rate. The top product rate is constant by difference since no accumulation or depletion of liquid or gas occurs in the apparatus. Liquid levels are maintained constant by liquid level instruments and pressure controllers maintain a constant pressure in the gas space of the apparatus. In the apparatus shown in the drawing the gas space is full of vapor at a pressure corresponding approximately to the vapor pressure of the liquid at the liquid-vapor interface near the top of adsorption column 1 between take-off lines 7 and 8. The liquid level in the carrying run of the elevator will be somewhat higher than the level in the adsorption column because of drag of the moving solids and because of the pressure drop due to vapor flow through the tubes in the desorber 4.

Liquid level controller 40 maintains the liquid level constant in the adsorption column 1 between take-off lines 7 and 8. Increasing liquid level causes the valve 41 in line 7 to open wider. Differential pressure controller 42 maintains the pressure differential across the constriction 5 constant at a value corresponding to no flow of gas through the constriction. If the pressure at the bottom of the constriction rises, the valve 43 in line 8 opens wider to permit the pressure to fall again. The liquid level in the adsorption column and the coolant rate through tubes 31 are adjusted with respect to each other so that there is always an evolution of vapor at the liquid-vapor interface. Pressure controller 44 keeps the pressure in the unit constant by opening the valve 45 in line 17 if the pressure rises. Liquid level controllers 46 and 47 operate valves 48 and 49 respectively at the discharge of pumps 20 and 29 to maintain the level in accumulators 19 and 27 constant. Pressure controller 50 by controlling valve 51 keeps the pressure constant in lines 7 and 8 and in the condenser 9. If the pressure should fall, valve 51 in line 10 closes, the liquid level rises in the condenser 9 and, as a consequence, the pressure again rises to its former value.

All instruments are of the proportional control type as opposed to on-and-off control and it may be desirable to equip the instruments with a recorder.

Typical operation of the controls may be described as follows: If a greater quantity of liquid should be carried over with the solids, the vapor in desorber 4 would start to move down, causing differential pressure controller 42 to close partially the control valve 43 in line 8 which in turn causes the pressure to rise in the unit. This causes pressure controller 44 to open wider the valve 45 in line 17 to allow excess vapor to be carried out through line 17. If, on the other hand, a greater quantity of vapor is generated at the liquid-vapor interface, vapor will start to flow upwardly through the constriction 5. Differential pressure controller 42 immediately opens the valve 43 in line 8 to remove the excess vapor formed and no other change occurs.

Not shown in the drawing are two temperature controllers which maintain constant temperature at the base of each section of the heating tubes 14 and 22 in the desorber 4 by regulating the rate of condensate withdrawal from the tubes. If the temperature rises a valve in the condensate line 16 or 24 closes, permitting condensate to rise in the tube and so lessen the heat transfer surface.

It may be necessary to bleed off a small stream of adsorbent continuously and regenerate it at a very high temperature because of the presence of traces of very strongly adsorbed materials or high molecular weight materials which would form a coating on the adsorbent. It may also be advisable to pass the feed through stationary beds of the adsorbent which will remove harmful components from the feed. These beds can be regenerated intermittently.

Heat economy may be effected by compressing the vapors removed through line 17 and sending them into heating tubes 14 via line 15 to supply heat for this section of the unit. Besides this, some of the heat in the vapor stream leaving through line 25 may be transferred to tubes 14 by means of a heat exchanger.

There are many possible variations in the process and apparatus of my invention. For liquids having a high vapor pressure at ordinary temperatures, the gas space in the elevator and above the desorber may be filled with vapor. For low vapor pressure materials, however, a condenser may be installed at the top of the elevator, open to the atmosphere through a drying chamber, or to an inert gas supply at atmospheric pressure, to condense and return to the carrying run of the elevator any vapors which may happen to reach this vent. The unit would then be run at a pressure of one atmosphere.

If a small fraction of only one fairly pure product is desired, the column may consist of either an enriching section alone such as the portion of adsorbing column 1 above feed inlet 2 or a stripping section alone such as the portion of adsorption column 1 below feed inlet 2.

Desorption may be carried out by heat alone or by heat with the aid of purge gas or vapor.

Solids flow may be made uniform over the cross-section of the desorber and the adsorption column by eliminating feeding device 12 and substituting an oscillating feed tray at the base of the adsorption column similar to the device used in the "Hypersorption" process.

The apparatus shown in the drawing need not be instrumented as disclosed and major modifications in design may require entirely different instrumentation. For example, a composition controller may be desirable for regulating the flow of one of the product streams. This would be useful if the feed composition changes appreciably and it is necessary to maintain a fairly constant product composition.

There are several ways in which my invention may be adapted for separating a multi-component mixture. If there are "$n$" components to be separated from one another in fairly high purity, "$n-1$" columns of the type described may be used to perform the separation. For example, the first column may withdraw one pure component from the mixture as top product and allow its bottom product to flow as feed into the second column. A second pure component is withdrawn in this column and the process is repeated until the last column is reached where the last two components are separated as pure products. To avoid using as many conveyors as there are columns, one column may be mounted above another with intermittently operated desorbers placed below each adsorption column. The desorber for the bottom adsorption column may be made continuous by placing it above the top adsorption column as is done in the single column unit shown in the drawing.

My invention may be adapted in another manner for separating multicomponent mixtures when one or more components of the mixture pass through the adsorbent particles to be recovered as nonadsorbed product while two or more other components of the mixture are adsorbed by the adsorbent particles and carried therewith to the desorber. In such a case my invention as previously described for separating mixtures into two components, i. e. an adsorbed component and a nonadsorbed component, may be modified by increasing the number of heating stages in the desorption zone. As in separating the two component mixtures, it is desirable to provide the initial heating stage at a temperature sufficient to vaporize only the occluded liquid whereby the adsorbed material may be vaporized subsequently in stages at successively higher temperatures and recovered uncontaminated by the occluded mixture. Thus, if the feed mixture is to be separated into three components, the desorber will be provided with a series of three sets of heating tubes. A portion of the feed mixture rich in one of the components will pass through the adsorbent particles and be recovered as nonadsorbed product while another portion of the feed mixture rich in the other two components will be adsorbed and will be carried by the adsorbent particles together with occluded feed mixture containing all three components to the desorber. The first heating means in the desorber will be a set of low temperature heating tubes which are heated by steam or other heat transfer agent to a temperature sufficient for vaporizing only the occluded mixture. The second heating means in the desorber will be tubes which are heated by high pressure steam or other high temperature heat transfer agent to a higher temperature than the first heating means which will vaporize a fraction of the adsorbed material which is rich in one of the adsorbed components. The final heating means in the desorber will be a set of heating tubes at a still higher temperature than the second and these heating tubes will vaporize the remaining adsorbed material which is rich in the third component. In this manner the adsorbed material may be recovered in two separate fractions, each fraction being rich in one component of the feed mixture. The number of heating stages in the desorber may be further increased if it is desired to obtain additioned fractions of the adsorbed material.

Another possible way to separate multi-component mixtures is to withdraw one or more side streams from a single adsorption column apparatus, such as is shown in the drawing, provided that one or more components of the mixture tends to concentrate at certain levels in the column between its top and bottom. In addition to the above methods, multi-component mixtures may be separated by employing various combinations of standard separation processes with the continuous adsorption process of my invention.

The advantages of the separation process of my invention as compared to prior art processes such as fractional distillation, extractive distillation, liquid-liquid extraction, "Hypersorption" and chromatography will be discussed in the following paragraphs.

Simple fractional distillation cannot be used to separate liquids which form constant boiling mixtures. Moreover, certain liquid mixtures exhibit such a small relative volatility that long columns and high energy expenditures are required. My new process may be employed for separating azeotropes and also mixtures having relatively poor volatility.

Extractive distillation and liquid-liquid extraction are satisfactory methods for separating liquids which form azeotropes or have low relative volatilities, but these processes are limited by the availability of suitable solvents for the particular materials to be separated. My process is useful for separating many liquids for which a suitable extractive solvent is not available.

The "Hypersorption" process as presently developed is limited to the separation of gases of different boiling ranges. Thus, "Hypersorption" is not readily applicable to the separation of materials such as propylene from propane or ethylene from ethane. Also, as disclosed in the literature, "Hypersorption" uses only activated carbon as the adsorbent. Most important however, is the fact that "Hypersorption" is designed for separating gaseous mixtures and does not encounter the problems of continuous liquid separation which the present invention solves by its plural stage thermal desorption and direct cooling of adsorbent particles with the non-adsorbed liquid.

Since chromatography is a batch process, my continuous process offers greater advantages in commercial operations. It is necessary in commercial operation of the batch process to provide a plurality of adsorption columns so that one group of the columns may be in the desorption stage while another group is in the on-stream adsorption stage. This, of course, causes undesirable multiplication of equipment and heat losses inherent to discontinuous operations which are avoided by my process.

Although my invention has been specifically described as employing silica gel adsorbent particles, it should be understood that the invention is not restricted to this particular adsorbent material. Any suitable porous material having adequate resistance to attrition for use in a flowing bed of particle-form adsorbent material and having the necessary preferential adsorption characteristics similar to those of silica gel may be employed. When I refer to adsorbent particles in the specification and claims, I mean either large or small particles of sizes commonly used in prior art adsorption processes and suitable for countercurrent flow in a liquid. Among the suitable adsorbent materials are silica gel, alumina, magnesia, activated carbon, fuller's earth, and Florisil.

My invention has been described in the separation of olefins and paraffins and specifically in separating propylene from propane, but it is to be understood that the separation of these specific materials is only one of the many uses for which my invention is adapted. It is known that the adsorptive affinity of silica gel and similar adsorbent materials varies with the chemical type of compound in accordance with the following decreasing order of adsorbability:

(1) Water
(2) Organic polar substances such as alcohols, phenols, ethers, and the corresponding sulfur and nitrogen compounds.
(3) Aromatic hydrocarbons
(4) Olefin hydrocarbons
(5) Naphthene hydrocarbons
(6) Paraffin hydrocarbons Thus my invention is applicable to the separation of a compound of any of these classes from compounds in another class having a different degree of adsorbability. The invention has particular applicability to the separation of olefins, paraffins, and diolefins from each other, e. g., propylene from propane, butadiene from butenes, butenes from butanes, ethylene from ethane, etc.

The invention is also useful in separating into molecular types the water soluble products of the Fischer-Tropsch process, in the production of absolute alcohol from 95% alcohol, in the removal of oil from wax, and in any similar process for separating the components of liquid mixtures having a different degree of adsorbability.

What I claim is:

1. A continuous process for separating a liquid mixture by selective adsorption which comprises causing a body of solid adsorbent particles to flow continuously through a desorption zone and an adsorption zone, introducing a liquid feed mixture into said adsorption zone in countercurrent flow to said adsorbent particles whereby a portion of the feed mixture is adsorbed by and carried with said adsorbent particles to be recovered as adsorbed product rich in one component of the feed mixture and another portion of the feed mixture passes through said adsorbent particles to be recovered as non-adsorbed product rich in another component of the feed mixture, heating the adsorbent particles as they flow through the desorption zone to vaporize the adsorbed material, continuously withdrawing the vaporized adsorbed material from the desorption zone as the adsorbed product, continuously withdrawing the non-adsorbed portion of the feed mixture from the adsorption zone as the non-adsorbed product, cooling the heated adsorbent particles as they enter the adsorption zone to restore their adsorbent properties by directly introducing said adsorbent particles, while they are substantially at the temperature utilized to vaporize adsorbed material, into the countercurrently flowing non-adsorbed portion of the liquid feed mixture prior to its withdrawal from the adsorption zone as non-adsorbed product.

2. A continuous process for separating a liquid mixture of more than two components by selective adsorption which comprises causing a body of solid adsorbent particles to flow continuously through a desorption zone and an adsorption zone, introducing a liquid feed mixture of more than two components into said adsorption zone in countercurrent flow to said adsorbent particles whereby a portion of the feed mixture containing a plurality of the components of the feed mixture is adsorbed by and carried with said adsorbent particles to be recovered as adsorbed products and another portion of the feed mixture passes through said adsorbent particles to be recovered as non-adsorbed product, heating the adsorbent particles as they flow through the desorption zone in a series of stages of successively higher temperatures whereby to vaporize the adsorbed material in a plurality of separate fractions, continuously withdrawing the vaporized fractions of the adsorbed material separately from the desorption zone as the adsorbed products, continuously withdrawing the non-adsorbed portion of the feed mixture from the adsorption zone as the non-adsorbed product and cooling the heated adsorbent particles as they enter the adsorption zone to restore their adsorbent properties by directly introducing said adsorbent particles, while they are substantially at the temperature utilized to vaporize adsorbed material, into the countercurrently flowing non-adsorbed portion of the liquid feed mixture prior to its withdrawal from the adsorption zone as non-adsorbed product.

3. A continuous process for separating a liquid mixture by selective adsorption which comprises causing a body of solid adsorbent particles to flow continuously through a desorption zone and an adsorption zone, introducing a liquid feed mixture into said adsorption zone in countercurrent flow to said adsorbent particles whereby a portion of the feed mixture is adsorbed by and carried with said adsorbent particles to be recovered as adsorbed product rich in one component of the feed mixture and another portion of the feed mixture passes through said adsorbent particles to be recovered as non-adsorbed product rich in another component of the feed mixture, an occluded liquid mixture intermediate in composition between the absorbed and non-adsorbed portions of the feed mixture being also carried with the adsorbent particles from the adsorption zone to the desorption zone, heating the adsorbent particles as they flow through the desorption zone initially at a temperature sufficient to vaporize the occluded liquid but not the adsorbed material and finally at a temperature sufficient to vaporize the adsorbed material whereby to recover the adsorbed material separately and substantially uncontaminated by the occluded mixture, continuously withdrawing the vaporized occluded mixture from the desorption zone, condensing the vaporized occluded mixture and returning it to the adsorption zone and continuously withdrawing the vaporized adsorbed material from the desorption zone as the adsorbed product.

4. A continuous process for separating a liquid mixture of more than two components by selective adsorption which comprises causing a body of solid adsorbent particles to flow continuously through a desorption zone and an adsorption zone, introducing a liquid feed mixture of more than two components in to said adsorption zone in countercurrent flow to said adsorbent particles whereby a portion of the feed mixture containing a plurality of the components of the feed mixture is adsorbed by and carried with said adsorbent particles to be recovered as adsorbed products and another portion of the feed mixture passes through said adsorbent particles to be recovered as non-adsorbed product, an occluded liquid mixture intermediate in composition between the adsorbed and non-adsorbed portions of the feed mixture being also carried with the adsorbent particles from the adsorption zone to the desorption zone, heating the adsorbent particles as they flow through the desorption zone in a series of stages of successively higher temperatures, the initial stage being at a temperature sufficient to vaporize the occluded liquid but not the adsorbed material and the subsequent stages being at successively higher temperatures whereby to recover the adsorbed material in a plurality of separate fractions each of which is rich in a single component of the feed mixture and substantially uncontaminated by the occluded mixture, continuously withdrawing the vaporized occluded mixture from the desorption zone, condensing the vaporized occluded mixture and returning it to the adsorption zone and continuously withdrawing the fractions of vaporized adsorbed material from the desorption zone as the adsorbed products.

5. A continuous process for separating a liquid mixture by selective adsorption which comprises causing a body of solid adsorbent particles to flow continuously through a desorption zone and an adsorption zone, introducing a liquid feed mixture into said adsorption zone in countercurrent flow to said adsorbent particles whereby a portion of the feed mixture is adsorbed by and carried with said adsorbent particles to be recovered as adsorbed product rich in one component of the feed mixture and another portion of the feed mixture passes through said adsorbent particles to be recovered as non-adsorbed product rich in another component of the feed mixture, an occluded liquid mixture intermediate in composition between the adsorbed and non-adsorbed portions of the feed mixture being also carried with the adsorbent particles from the adsorption zone to the desorption zone, heating the adsorbent particles as they flow through the desorption zone initially at a temperature sufficient to vaporize the occluded liquid but not the adsorbed material and finally at a temperature sufficient to vaporize the adsorbed material whereby to recover the adsorbed material separately and substantially uncontaminated by the occluded mixture, continuously withdrawing the vaporized occluded mixture from the desorption zone, condensing the vaporized occluded mixture and returning it to the adsorption zone to be separated, continuously withdrawing the vaporized adsorbed material from the desorption zone as the adsorbed product, continuously withdrawing the non-adsorbed portion of the feed mixture from the adsorption zone as the non-adsorbed product, cooling the heated adsorbent particles as they enter the adsorption zone to restore their adsorbent properties by directly introducing said heated adsorbent particles without prior cooling into the countercurrently flowing non-adsorbed portion of the liquid feed mixture prior to its withdrawal from the adsorption zone as non-adsorbed product.

6. A continuous process for separating a mixture of liquid organic compounds by selective adsorption which comprises causing a body of solid adsorbent particles to flow as a substantially compact column, continuously downwardly by gravity flow through a desorption zone and an adsorption zone therebelow, continuously introducing a liquid feed mixture into said adsorption zone in upward flow countercurrently to the flow of adsorbent particles whereby a portion of the feed mixture is adsorbed by and carried downwardly with said adsorbent particles to be recovered as adsorbed product rich in one compound of the feed mixture and another portion of the feed mixture passed upwardly through said adsorbent particles to be recovered as non-adsorbed product rich in another compound of the feed mixture, an occluded liquid mixture intermediate in composition between the adsorbed and non-adsorbed portions of the feed mixture being also carried downwardly with the adsorbent particles, conveying the adsorbent particles bearing adsorbed and occluded portions of the liquid feed mixture from the lower end of said adsorption zone to the upper end of said desorption zone and introducing said particles into the upper end of said desorption zone for gravity flow therethrough, heating the adsorbent particles initially as they flow through said desorption zone to a temperature sufficient to vaporize the occluded liquid mixture but not the adsorbed material, continuously withdrawing the vaporized occluded mixture from the desorption zone, condensing the vaporized occluded mixture and returning it to the adsorption zone, subsequently heating the adsorbent particles as they continue to flow through the desorption zone to a higher temperature sufficient to vaporize the adsorbed material, continuously withdrawing the vaporized adsorbed material from the desorption zone whereby to recover said adsorbed material separately and substantially uncontaminated by occluded mixture, condensing the vaporized adsorbed product and returning a portion thereof to the adsorption zone as reflux, continuously removing the non-adsorbed product as vapor and liquid from near the upper end of the adsorption zone, cooling the heated adsorbent particles as they enter the adsorption zone to restore their adsorbent properties by directly introducing said particles, while they are substantially at the temperature utilized to vaporize adsorbed material, into the upwardly flowing non-adsorbed portion of the liquid feed mixture near the upper end of the adsorption zone prior to its withdrawal from the adsorption zone as non-adsorbed product.

7. Liquid separation apparatus comprising an adsorption section in which a liquid feed mixture is flowed countercurrently to solid adsorbent particles, a desorption section in which adsorbed material is thermally desorbed from adsorbent particles passing therethrough, and means for providing continuous flow of solid adsorbent particles through said sections, said desorption section having means for heating adsorbent particles passing therethrough whereby to drive off adsorbed material from said particles, said adsorption section having an entrance for adsorbent particles at one end thereof, an exit for adsorbent particles at the other end thereof, a feed inlet means between said entrance and exit for introducing liquid feed mixture in flow toward said entrance countercurrently to the flow of adsorbent particles, and means for removing a non-adsorbed portion of said feed mixture disposed near said entrance for adsorbent particles between said feed inlet means and said entrance, the entrance to said adsorption section being positioned to receive adsorbent particles from the desorption section and being closer to said desorption section along the path of adsorbent particles flow than any active cooling means, and means for introducing hot desorbed adsorbent particles directly from the desorption section into initial cooling contact with the non-adsorbed portion of the liquid mixture within and near the entrance to said adsorption section.

8. Liquid separation apparatus comprising an adsorption section in which a liquid feed mixture is flowed countercurrently to solid adsorbent particles, a desorption section in which adsorbed material is thermally desorbed from adsorbent particles passing therethrough, and means for providing continuous flow of solid adsorbent particles through said sections, a first heating means within said desorption section for heating adsorbent particles flowing therethrough initially to a temperature sufficient to vaporize occluded portions of liquid feed mixture but not adsorbed material, additional heating means within said desorption section spaced from said first heating means in the direction of flow of adsorbent particles for increasing the temperature of adsorbent particles as they flow from said first heating means to drive off adsorbed material, a plurality of means connected to the desorption section for withdrawing vaporized occluded mixture and vaporized adsorbed material from the desorption section, said adsorption section having an entrance for adsorbent particles at one end thereof, an exit for adsorbent particles at the other end thereof, a feed inlet means between said entrance and exit for introducing liquid feed mixture in flow toward said entrance countercurrently to the flow of adsorbent particles, and means for removing a non-adsorbed portion of said feed mixture disposed near said entrance for adsorbent particles between said feed inlet means and said entrance, said entrance for adsorbent particles to the adsorption section being positioned to receive adsorbent particles from the desorption section and being closer to said desorption section along the path of adsorbent particles flow than any active cooling means, means for introducing hot desorbed adsorbent particles from the desorption section directly into the entrance for adsorbent particles of the adsorption section for initial cooling contact with the non-adsorbed portion of the liquid mixture within and near the entrance to said adsorption section.

9. Liquid separation apparatus comprising an adsorption section in which a liquid feed mixture is flowed countercurrently to solid adsorbent particles passing therethrough in gravity flow, a desorption section above said adsorption section in which adsorbed material is thermally desorbed from adsorbent particles passing therethrough in gravity flow, and means for continuously conveying solid adsorbent particles from the lower end of said adsorption section and introducing said particles into the upper end of said desorption section, a first heating means within and near the upper end of said desorption section for heating adsorbent particles passing through said desorption section to a temperature sufficient to drive off occluded liquid mixture but not adsorbed material, additional heating means within said desorption section below said first heating means for increasing the temperature of adsorbent particles leaving the preceding heating means to drive off adsorbed material, a plurality of means connected to the desorption section for withdrawing vaporized occluded mixture and vaporized adsorbed material from the desorption section, said adsorption section having an entrance for adsorbent particles at its upper end, and an exit for adsorbent particles at its lower end, and a feed inlet means between said entrance and exit for introducing liquid feed mixture in upward flow in said adsorption section countercurrently to the downward flow of adsorbent particles, means for removing a non-adsorbed portion of said feed mixture disposed above the feed inlet means and near the upper end of said adsorption section, the entrance to said adsorption section being closer to said desorption section along the path of adsorbent particles flow than any active cooling means, a conduit connecting the lower end of the desorption section with the entrance to the adsorption section for introducing hot desorbed adsorbent particles directly from the desorption section into initial cooling contact with the non-adsorbed portion of the liquid mixture within and near the upper end of the adsorption section.

10. Liquid separation apparatus comprising a vertical column and means for continuously conveying solid adsorbent particles from the lower end of said column and introducing said particles into the upper end of said column, said column comprising a desorption section in the upper portion thereof and an adsorption section in the lower portion thereof, a first heating means within and near the upper end of said desorption section for initially heating adsorbent particles passing through the desorption section to a temperature sufficient to vaporize occluded liquid mixture carried by said particles but not adsorbed material, a plurality of additional heating means within said desorption section spaced apart vertically below said first heating means for progressively increasing the temperature of adsorbent particles as they flow from one heating means to the next lowest heating means to drive off adsorbed material in a plurality of fractions, conduits connected to the desorption section for withdrawing vaporized occluded mixture and fractions of vaporized adsorbed material from the desorption section, said adsorption section having a feed inlet conduit between its upper and lower ends for introducing liquid feed mixture in upward flow countercurrently to the downward flow of solid adsorbent particles, and a conduit for removing a non-adsorbed portion of said feed mixture disposed above the feed inlet conduit and near the upper end of said adsorption section, the upper end of said adsorption section being positioned directly below the lower end of the desorption section and being closer to said desorption section along the path of solid adsorbent particles flow than any active cooling means, a constriction in said vertical column connecting the lower end of the desorption section directly with the upper end of the adsorption section for introducing hot desorbed adsorbent particles directly from the desorption section into initial cooling contact with the non-adsorbed portion of the liquid mixture within and near the upper end of the adsorption section.

MARIO T. CICHELLI.

REFERENCES CITED

The following references are of record in the file of this patent:

UNITED STATES PATENTS

| Number | Name | Date |
|---|---|---|
| 2,384,311 | Kearby | Sept. 4, 1945 |
| 2,470,339 | Claussen et al. | May 17, 1949 |
| 2,519,873 | Berg | Aug. 22, 1950 |
| 2,529,289 | Gilliland | Nov. 7, 1950 |